US011870957B2

(12) United States Patent
Matsuda (10) Patent No.: US 11,870,957 B2
(45) Date of Patent: *Jan. 9, 2024

(54) INFORMATION PROCESSING DEVICE AND INFORMATION OUTPUT METHOD FOR OUTPUTTING INFORMATION IF NO RESPONSE INDICATING INFORMATION HAS BEEN CONFIRMED HAS BEEN MADE

(71) Applicant: SHARP KABUSHIKI KAISHA, Sakai (JP)

(72) Inventor: Chikara Matsuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,187

(22) Filed: Mar. 29, 2022

(65) Prior Publication Data

US 2022/0222031 A1 Jul. 14, 2022

Related U.S. Application Data

(63) Continuation of application No. 16/901,446, filed on Jun. 15, 2020, now Pat. No. 11,323,578.

(30) Foreign Application Priority Data

Jun. 21, 2019 (JP) ................... 2019-115701

(51) Int. Cl.
*H04N 1/00* (2006.01)
*H04N 1/32* (2006.01)
(Continued)

(52) U.S. Cl.
CPC ....... *H04N 1/00403* (2013.01); *G06F 3/1415* (2013.01); *G06F 3/16* (2013.01); *H04N 1/00119* (2013.01); *H04N 1/32101* (2013.01)

(58) Field of Classification Search
CPC .............. G06F 3/1292; H04N 1/00106; H04N 1/00164; H04N 1/00973; H04N 1/32776;
(Continued)

(56) References Cited

U.S. PATENT DOCUMENTS

2003/0109289 A1\* 6/2003 Ito ....................... H04M 19/041
455/567
2007/0222771 A1 9/2007 Brask et al.
(Continued)

FOREIGN PATENT DOCUMENTS

| JP | H09-81494 A | 3/1997 |
| JP | 2007-060208 A | 3/2007 |
| JP | 2016-178701 A | 10/2016 |

OTHER PUBLICATIONS

Non-final Rejection of U.S. Appl. No. 16/901,446 dated Mar. 4, 2021.
(Continued)

*Primary Examiner* — Kent Yip
(74) *Attorney, Agent, or Firm* — ScienBiziP, P.C.

(57) ABSTRACT

According to an embodiment, provided is an information notification system in which a multifunction peripheral including an audio device is associated with external audio devices so that the user of the multifunction peripheral is notified of a message. The information notification system is featured by including a message determiner which determines the contents of the message, a user position detector which detects a position of the user, an output device specifying section which specifies, based on a result of determination by the message determiner and a result of detection by the user position detector, the audio device which outputs the message, and a controller which performs control so that the message is notified from the specified audio device. As the audio device for outputting the message
(Continued)

is specified according to the contents of the message, the message is notified from the specified audio device.

7 Claims, 9 Drawing Sheets

(51) Int. Cl.
*G06F 3/14* (2006.01)
*G06F 3/16* (2006.01)

(58) Field of Classification Search
CPC ....... H04N 2201/0075; H04N 1/00403; H04N 1/00408; H04N 1/00119; H04N 1/00488; H04N 1/00509; H04N 1/00514
USPC ........................................................ 358/1.15
See application file for complete search history.

(56) References Cited

U.S. PATENT DOCUMENTS

| | | |
|---|---|---|
| 2008/0228915 A1 | 9/2008 | Tamura |
| 2009/0091784 A1 | 4/2009 | Yamaguchi et al. |
| 2009/0322522 A1 | 12/2009 | Meunier |
| 2010/0277762 A1 | 11/2010 | Eguchi et al. |
| 2014/0293339 A1 | 10/2014 | Satou |
| 2018/0275945 A1 | 9/2018 | Hamada |
| 2018/0285061 A1* | 10/2018 | Park ................. G06F 3/0488 |
| 2019/0109955 A1* | 4/2019 | Adachi ................. H04R 3/12 |
| 2019/0303097 A1* | 10/2019 | Kaimori ............ H04N 1/00488 |

OTHER PUBLICATIONS

Final Rejection of U.S. Appl. No. 16/901,446 dated Sep. 16, 2021.
Notice of Allowance of U.S. Appl. No. 16/901,446 dated Jan. 5, 2022.

* cited by examiner

INFORMATION PROCESSING DEVICE AND INFORMATION OUTPUT METHOD FOR OUTPUTTING INFORMATION IF NO RESPONSE INDICATING INFORMATION HAS BEEN CONFIRMED HAS BEEN MADE

This application is a continuation of U.S. patent application Ser. No. 16/901,446, filed Jun. 15, 2020, which claims priority under 35 U.S.C. § 119(a) on Patent Application No. 2019-115701 filed in Japan on 21 Jun. 2019, the entire contents of which are hereby incorporated by reference.

BACKGROUND OF THE INVENTION

Field of the Invention

The present invention relates to an image forming apparatus, and more particularly, to an image forming apparatus provided with an output device which outputs notified information, and the like.

Description of the Background Art

Conventionally, in a multifunction peripheral (multifunction printer (MFP)) having the function as an image forming apparatus, voice messages to be output from the multifunction peripheral are output from an output device (a speaker) provided on the multifunction peripheral body. For this reason, when the multifunction peripheral and the user are at a distance far from each other, or when the user is not present at the place, the user may not notice completion of the job or an error since the user is unable to receive a voice message output from the multifunction peripheral.

As a conventional technology, for example, an information notification system, which is configured such that a position where a person is present is detected, and a voice message is transmitted to a speaker located at a place where the person is present to notify information by way of the voice message, is disclosed (see Japanese Unexamined Patent Application Publication No. 2016-178701).

According to the technology of Japanese Unexamined Patent Application Publication No. 2016-178701 (Patent Literature 1), it is possible to obtain an advantage of being able to notify a user of useful information at an appropriate timing in the information notification system.

In addition, as another example, a conference assistance device, which is provided with means for assisting transfer of voices between conference participants, configured to output a voice message to all members or a specific person corresponding to notification destinations set in advance, is disclosed (see Japanese Unexamined Patent Application Publication No. 2007-60208).

According to the technology of Japanese Unexamined Patent Application Publication No. 2007-60208 (Patent Literature 2), it is possible to select in advance a notification destination to which a conference termination notification is to be sent according to the contents of the conference, and send the conference termination notification to the notification destination.

However, in the technologies described in Patent Literatures 1 and 2, no consideration is made for notification of a voice message based on determining of whether the notification should be made to a specific user or all of the users according to the contents of the voice message.

Also, in the technology described in Patent Literature 2, the notification is made by setting a message notification destination in advance. However, a disadvantage arises, when a target person who is to receive the notification is not present at the notification destination, due to the target person being unable to confirm the notification.

The present invention has been conceived in view of the problems as mentioned above presented conventionally, and an object of the present invention to provide an image forming apparatus, for example, which is capable of reliably notifying a user of information which has been notified.

SUMMARY OF THE INVENTION

An image forming apparatus according to the present invention is provided with an output device which outputs information (voice information, character information, etc.) to be notified to a user, a controller which causes the information to be output to the output device, and a communicator which performs communication connection with an external output device and a server. The image forming apparatus is characterized in that control is performed by the controller to output the information from the output device specified by the server according to the contents of the information.

Further, an information notification system according to the present invention pertains to an information notification system in which an image forming apparatus, which is provided with an output device that outputs information to be notified to a user, an external output device, and a server are associated with each other, to notify the user of the image forming apparatus of the information (voice information, character information, etc.). The information notification system is characterized in that as the configuration of the server, the server includes an information determiner which determines the contents of the information, a user position detector which detects a position of the user, an output device specifying section which specifies, on the basis of a result of determination by the information determiner and a result of detection by the user position detector, the output device outputting the information, and a controller which performs control so that the information is output from the specified output device.

Furthermore, an information notification method according to the present invention pertains to an information notification method in which an image forming apparatus, which is provided with an output device that outputs information to be notified to a user, and an external output device are associated with each other, to notify the user of the image forming apparatus of the information. The information notification method is characterized by including the step of determining the contents of the information, the step of detecting a position of the user, the step of specifying, on the basis of a result of determination of the contents of the information and a result of detection of the user, the output device outputting the information, and the step of performing control so that the information is notified from the specified output device, and that the information is output from the specified output device.

According to the image forming apparatus, etc., of the present invention, it is possible to provide an image forming apparatus and the like capable of reliably notifying a user of notified information by providing an output device which outputs the information to be notified to the user, and outputting the information from the output device which has been specified according to the contents of the notified information.

DESCRIPTION OF THE PREFERRED EMBODIMENTS

First Embodiment

Hereinafter, a first embodiment of the present invention will be described with reference to the accompanying drawings.

Figure 1:
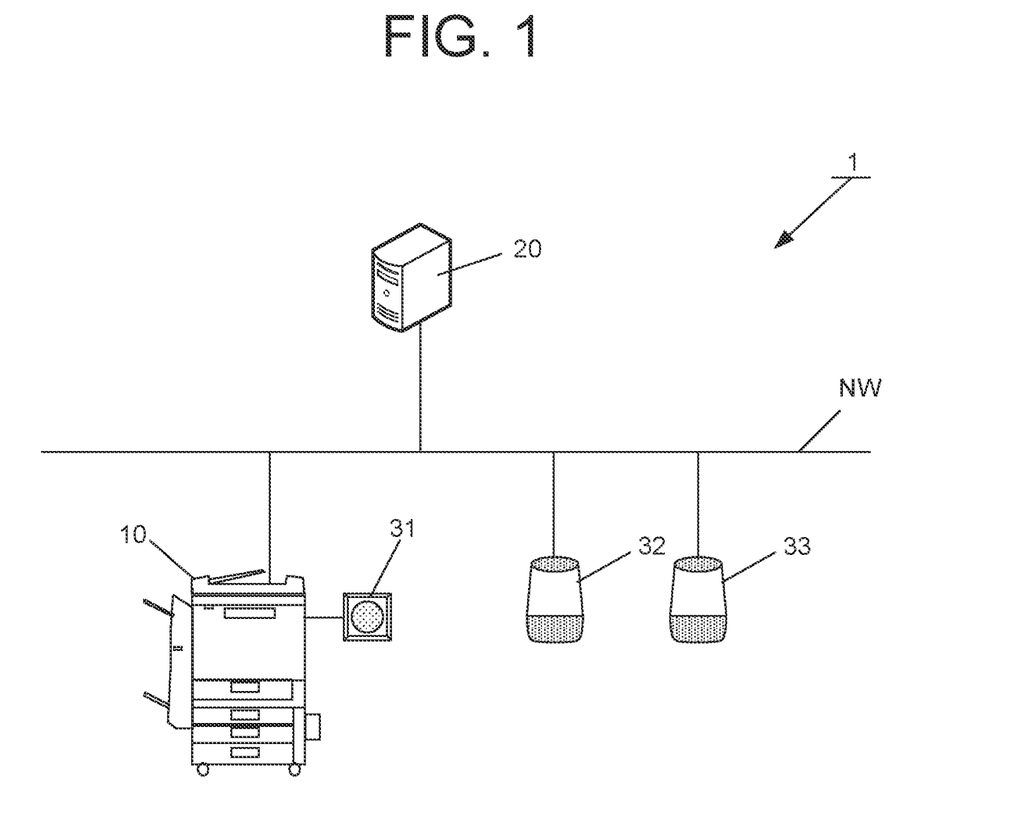
FIG. 1 is a view for illustrating a configuration of an information notification system according to a first embodiment.
Figure 2:
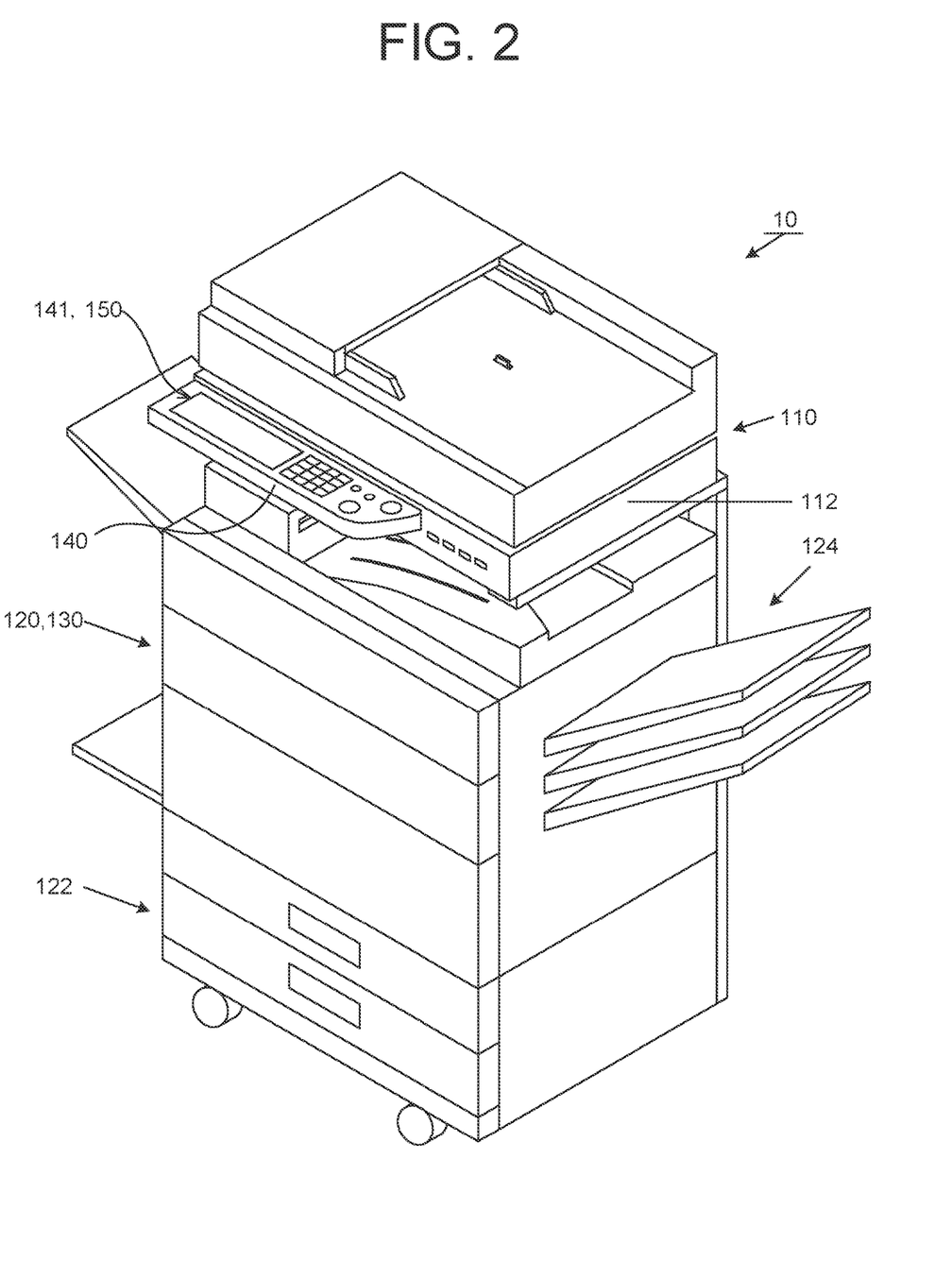
FIG. 2 is a view for illustrating the structure of a multifunction peripheral constituting the information notification system.
Figure 3:
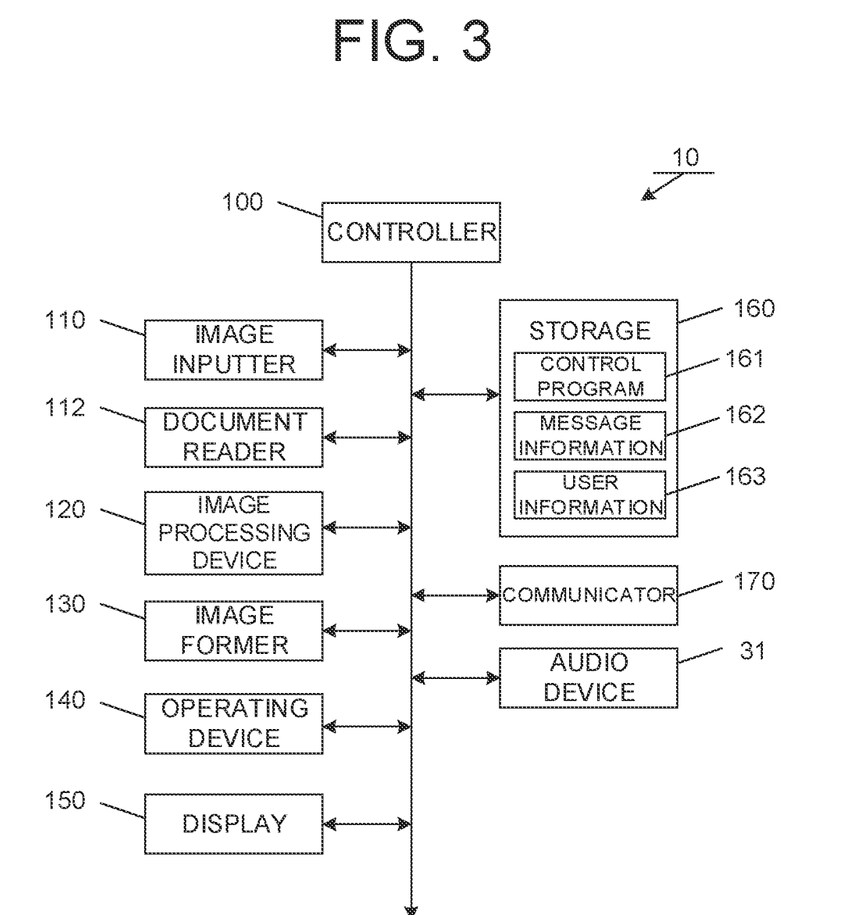
FIG. 3 is a block diagram illustrating a configuration of the multifunction peripheral.
Figure 4:
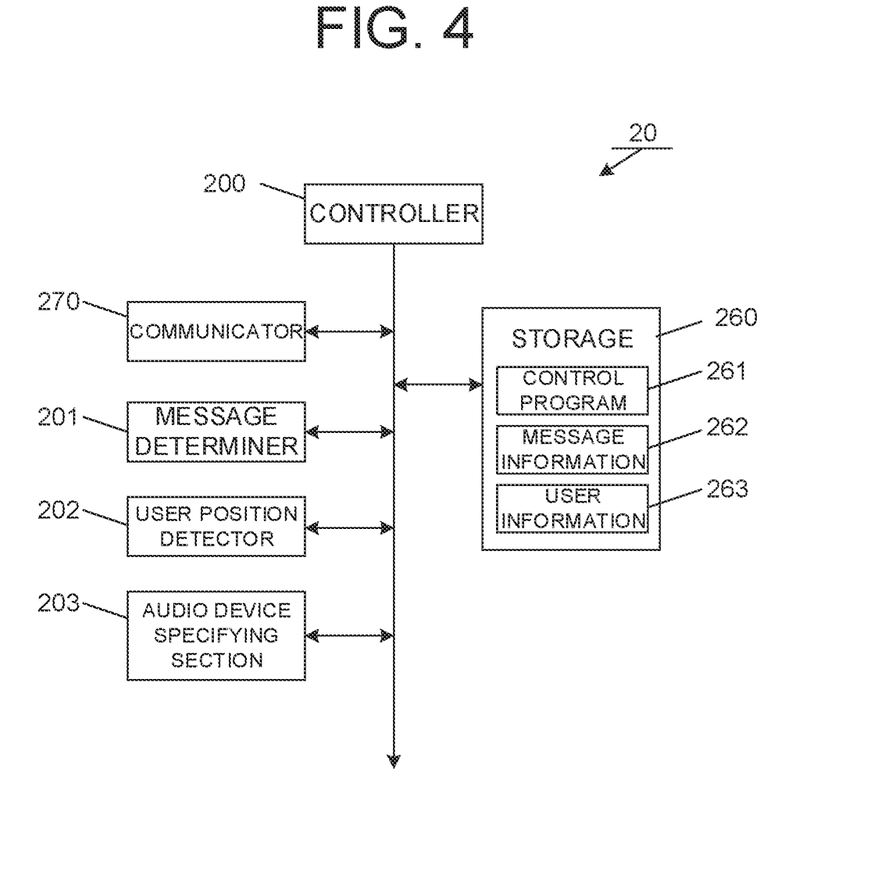
FIG. 4 is a block diagram illustrating a configuration of a server constituting the information notification system.
Figure 5:
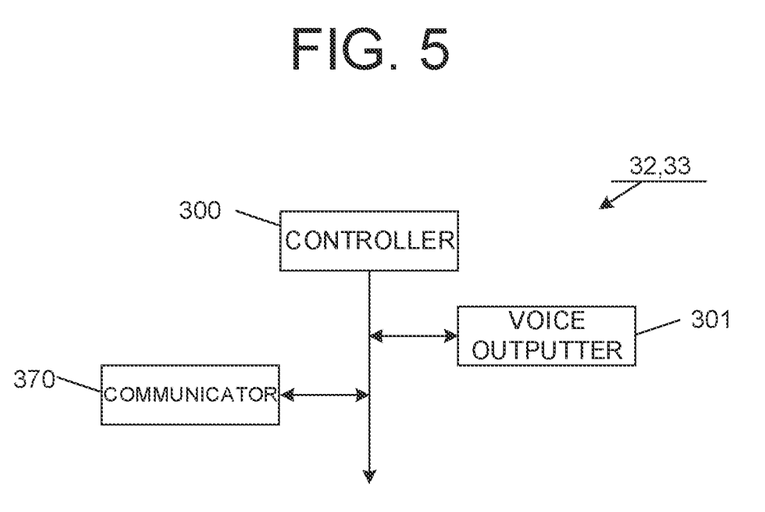
FIG. 5 is a block diagram illustrating a configuration of an audio device constituting the information notification system.

FIG. 1 is a view for illustrating a configuration of an information notification system according to the first embodiment of the present invention, which is an example of an embodiment for carrying out the present invention; FIG. 2 is a view for illustrating the structure of a multifunction peripheral constituting the information notification system; FIG. 3 is a block diagram illustrating a configuration of the multifunction peripheral; FIG. 4 is a block diagram illustrating a configuration of a server constituting the information notification system; and FIG. 5 is a block diagram illustrating a configuration of an audio device constituting the information notification system.

Configuration of Information Notification System

As illustrated in FIG. 1, the first embodiment corresponds to an information notification system 1 in which a multifunction peripheral 10 equipped with an audio device 31 as an output device, a server 20, and audio devices 32 and 33 as external output devices are communicably connected via a communication network NW.

The information notification system 1 is characterized in that the information notification system 1 specifies, according to the contents of information notified from the multifunction peripheral 10, the output device which is to output the information, and notifies the information from the specified output device.

Configuration of Multifunction Peripheral

First, the configuration of the multifunction peripheral 10 which constitutes the information notification system 1 according to the first embodiment will be described.

The multifunction peripheral 10 is an information processing apparatus, which is provided with a plurality of functions such as a copy mode and a fax mode, and functions as an image forming apparatus that reads an image of a document by providing a document reader 112 at an upper part of the apparatus body, as illustrated in FIG. 2, and outputs the image by an electrophotographic method.

As illustrated in FIG. 3, the multifunction peripheral 10 is characterized by including a controller 100, an image inputter 110, the document reader 112, an image processing device 120, an image former 130, an operating device 140, a display 150, a storage 160, and a communicator 170, as the main constituent elements, and by further including an audio device (for example, a speaker) 31.

The controller 100 is a functional part for controlling the entire multifunction peripheral 10.

Further, the controller 100 implements various functions by reading and executing various programs, and is, for example, composed of one or more arithmetic devices (such as a central processing unit (CPU)).

The image inputter 110 is a functional part for reading image data input to the multifunction peripheral 10. Further, the image inputter 110 is connected to the document reader 112, which is a functional part for reading the image of a document, and inputs the image data that is output from the document reader 112.

Also, the image inputter 110 may input the image data from a storage medium such as a universal serial bus (USB) flash drive or a secure digital (SD) card. Moreover, a communicator which connects with the other terminal devices may be provided so that image data may be input from the other terminal devices.

The image processing device 120 is a functional part for forming output data based on the image data on a recording medium (for example, recording paper). For example, as illustrated in FIG. 2, the recording paper is fed from a paper feed tray 122, and after an image has been formed on the surface of the recording paper in the image processing device 120, the recording paper is discharged from a paper discharge tray 124. The image processing device 120 is composed of, for example, a laser printer using the electrophotographic method.

The image former 130 is a functional part which performs various types of image processing on the image data. Then, an output image is formed on the basis of the image data subjected to the image processing.

The operating device 140 is a functional part for receiving an operation instruction given by a user, and is composed of various key switches, a device which detects an input by contact, and the like. The user inputs the function to be used, and an output condition via the operating device 140.

The display 150 is a functional part for displaying various kinds of information to the user, and is composed of, for example, a liquid crystal display (LCD) or the like.

Note that the multifunction peripheral 10 may include a touch panel in which an operation panel 141 and the display 150 are formed integrally, as illustrated in FIG. 2. In this case, a method for detecting an input on the touch panel may be any general detection method such as a resistive film type, an infrared type, an electromagnetic induction type, or a capacitive type.

The storage 160 is a functional part in which various programs including a control program 161 necessary for the operation of the multifunction peripheral 10, various kinds of data including read data, message information 162, user information 163, etc., are stored. The storage 160 is composed of, for example, a solid-state drive (SSD), which is a semiconductor memory, or a hard disk drive (HDD).

The communicator 170 performs communication connection with the server 20 and the audio devices 32 and 33 via the network NW, and notifies the audio devices 32 and 33, which have been specified as the audio devices which are to output a message, of message information. When the audio devices 32 and 33 are not specified as the audio devices for outputting the message, it is notified by the server 20 that the audio devices 32 and 33 are not specified as the audio devices for outputting the message.

The audio device 31 outputs operation guidance and each message by voice.

Configuration of Server

Next, the configuration of the server 20 which constitutes the information notification system 1 according to the first embodiment will be described.

As illustrated in FIG. 4, the server 20 is characterized by including a controller 200, a storage 260, and a communicator 270, as the main constituent elements, and by further including a message determiner (information determiner) 201, a user position detector 202, and an audio device specifying section (output device specifying section) 203.

The controller 200 is a functional part for controlling the entire server 20.

Further, the controller 200 implements various functions by reading and executing various programs, and is, for example, composed of one or more arithmetic devices (such as a central processing unit (CPU)).

The storage 260 is a functional part in which various programs including a control program 261 necessary for the operation of the server 20, various kinds of data including read data, message information 262, user information 263, etc., are stored. The storage 260 is composed of, for example, a solid-state drive (SSD), which is a semiconductor memory, or a hard disk drive (HDD).

The message determiner 201 determines, on the basis of, for example, job information of the user, the state of the device of the multifunction peripheral 10, and the operation status, whether a message notified from the multifunction peripheral 10 corresponds to information related to the user, information related to maintenance, trouble, or the like, of the device body, or information requiring urgent attention on the device body.

The user position detector 202 detects a location of the user, on the basis of a result of detection obtained by a human detection device which detects a human by a camera (not illustrated), a human sensor, an entry record, illuminance, a sound, etc., and user information (e.g., information on the room where the user is in by entry through authentication).

The audio device specifying section 203 specifies the audio device which is to output the message, on the basis of a result of determination by the message determiner 201, and a result of detection by the user position detector 202.

In the first embodiment, when the message determiner 201 determines that the message corresponds to information concerning a specific user (for example, information regarding processing for the user, such as completion of the job of the user), the audio device specifying section 203 specifies the audio device capable of notifying the specific user of the message.

The communicator 270 performs communication connection with the multifunction peripheral 10 and the audio devices 32 and 33 via the network NW, and notifies the audio devices 32 and 33, which have been specified as the audio devices which are to output the message, of the message information. When the audio devices 32 and 33 are not specified as the audio devices for outputting the message, the communicator 270 notifies the multifunction peripheral 10 that the audio devices 32 and 33 are not specified as the audio devices for outputting the message.

Configuration of Audio Device

As illustrated in FIG. 5, each of the audio devices 32 and 33 is characterized by including a controller 300, a voice outputter (a speaker) 301, and a communicator 370, as the main constituent elements.

The controller 300 is a functional part for controlling each of the audio devices 32 and 33 as a whole.

Further, the controller 300 is, for example, composed of one or more arithmetic devices (such as a central processing unit (CPU)).

The voice outputter 301 outputs a voice message (message information) notified from the multifunction peripheral 10 or the server 20.

For the audio devices 32 and 33, an interactive audio device, such as the so-called smart speaker, which functions as a microphone and a speaker may be employed as the output device. Also, the audio devices 32 and 33 may be those in direct communication connection with the multifunction peripheral 10.

The communicator 370 performs communication connection with the multifunction peripheral 10 and the server 20 via the network NW, and when the audio devices 32 and 33 are specified as the audio devices which are to output the message, the audio devices 32 and 33 are notified of the message information.

Processing Steps for Voice Instruction in Information Notification System

Next, in the information notification system 1 according to the first embodiment, processing steps performed in notifying the user of a message by voice from the multifunction peripheral 10 will be described referring to the accompanying drawing.

Figure 6:
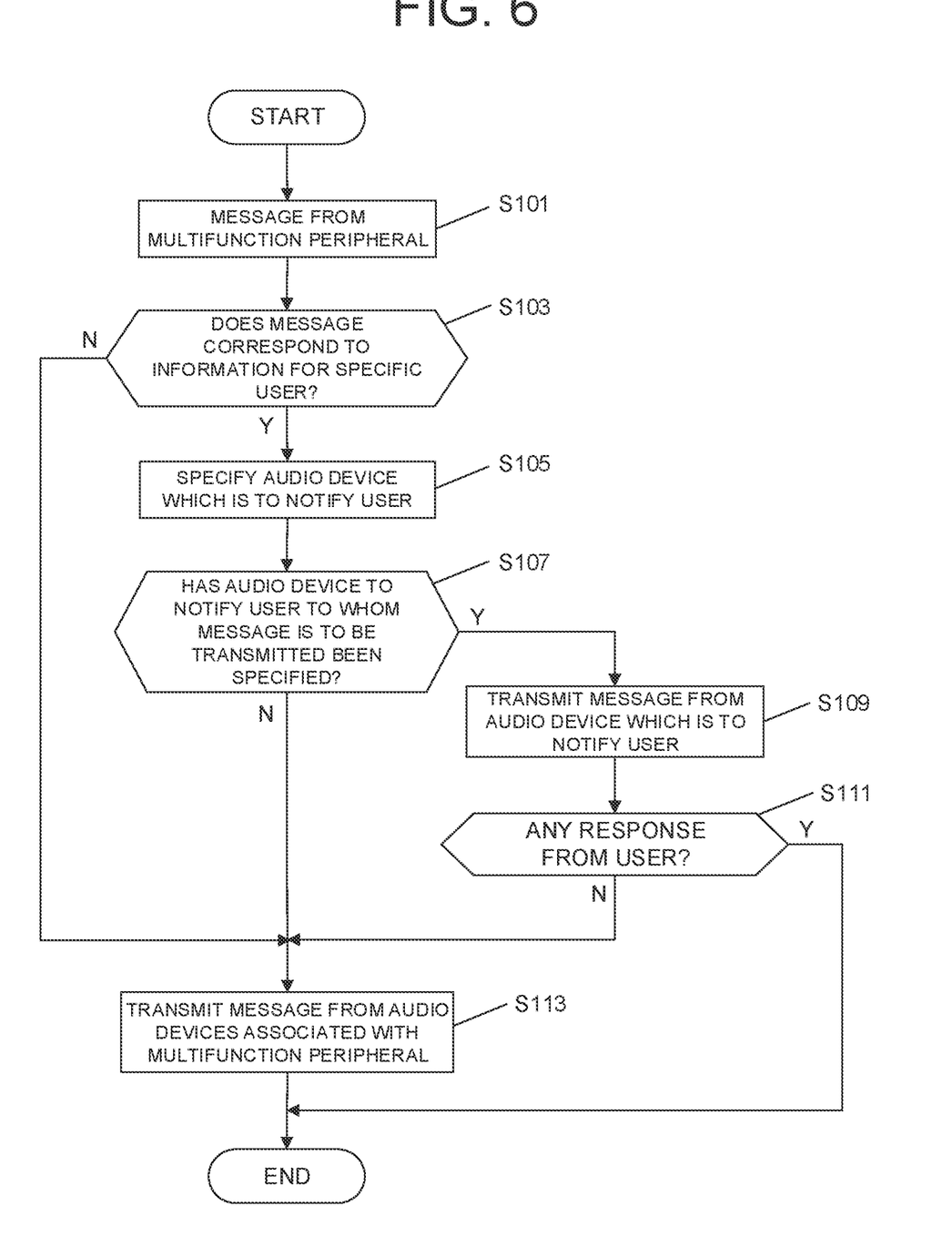
FIG. 6 is a flowchart showing processing steps to be performed in notifying a user of a message from the multifunction peripheral in the information notification system.

FIG. 6 is a flowchart showing the processing steps to be performed in notifying the user of a message from a multifunction peripheral in the information notification system according to the first embodiment.

In the information notification system 1, in a case where a voice message (message information) is to be notified from the multifunction peripheral 10 to the user, the steps are performed as illustrated in FIG. 6. That is, first, when occurrence of a message which should be output is notified from the multifunction peripheral 10 to the server 20 (step S101), the server 20 determines, by the message determiner 201, whether the message corresponds to information for a specific user (step S103).

In step S103, when it is determined that the message corresponds to information for the specific user, the audio device, which is to notify the specific user of the message, is specified (step S105). The specification of the audio device is carried out by the audio device specifying section 203, on the basis of the result of detection by the user position detector 202. Then, the processing proceeds to step S107.

Meanwhile, in step S103, when it is determined that the message does not correspond to the information for a specific user, the processing proceeds to step S113. Then, by having the message transmitted from the multifunction peripheral 10 to the associated audio devices without specification of the audio devices, a voice message is output from each of the audio devices associated with the multifunction peripheral 10.

In step S107, it is determined whether the audio device, which is located at a place where the user to whom the message is to be notified is present, has been specified.

In step S107, when it is determined that the audio device, which is located at a place where the user to whom the message is to be notified is present, has been specified, the message is notified from the multifunction peripheral 10 to the specified audio device, which is located at the place where the user is, whereby the message is output by voice (step S109).

Then, it is determined whether the user has made a response indicating that the message has been confirmed (step S111).

In step S111, when it is determined that the user has made a response indicating that the message has been confirmed, the processing of notification of a message is ended.

Meanwhile, in step S111, when it is determined that the user has made no response indicating that the message has been confirmed, the processing proceeds to step S113. Then, a voice message is output from each of the audio devices associated with the multifunction peripheral 10.

Also, in step S107, when it is determined that the audio device, which is located at the place where the user to whom the message is to be notified is present, cannot be specified, the processing proceeds to step S113. Then, a voice message is output from each of the audio devices associated with the multifunction peripheral 10.

In this way, the processing of notification of a message is ended.

By virtue of the above configuration, according to the first embodiment, the information notification system 1 has been structured such that the multifunction peripheral 10 including the audio device 31 is associated with the external audio devices 32 and 33, the message determiner 201, the user position detector 202, and the audio device specifying section 203 are provided, and the audio device, which is to output a message, is specified according to the contents of the message notified from the multifunction peripheral 10, so that the message is output from the specified audio device. Accordingly, the message notified from the multifunction peripheral 10 can be reliably transmitted to the user.

Note that in the first embodiment, the server 20 is provided with the message determiner 201, the user position detector 202, and the audio device specifying section 203, so that the server 20 specifies the audio device from which the message is to be notified. However, for example, the message determiner 201, the user position detector 202, and the audio device specifying section 203 may be provided in the multifunction peripheral 10, so that the multifunction peripheral 10 may specify the audio device from which the message is to be notified.

Also, in the first embodiment, the audio devices 31, 32, and 33 are employed as the output devices, but the output device may be simply a speaker which outputs a sound. Further, instead of the audio device, a display device (the display) may be employed so that the display device (display) functions as an output device that visually gives an output by displaying a message.

Furthermore, by displaying an image including a message on the display device, the message may be made to be easily recognized visually.

Second Embodiment

Next, a second embodiment will be described.

The second embodiment is characterized in that when a specific user is to be notified of a message in an information notification system 1, an audio device capable of notifying the message near the specific user is specified.

Figure 7:
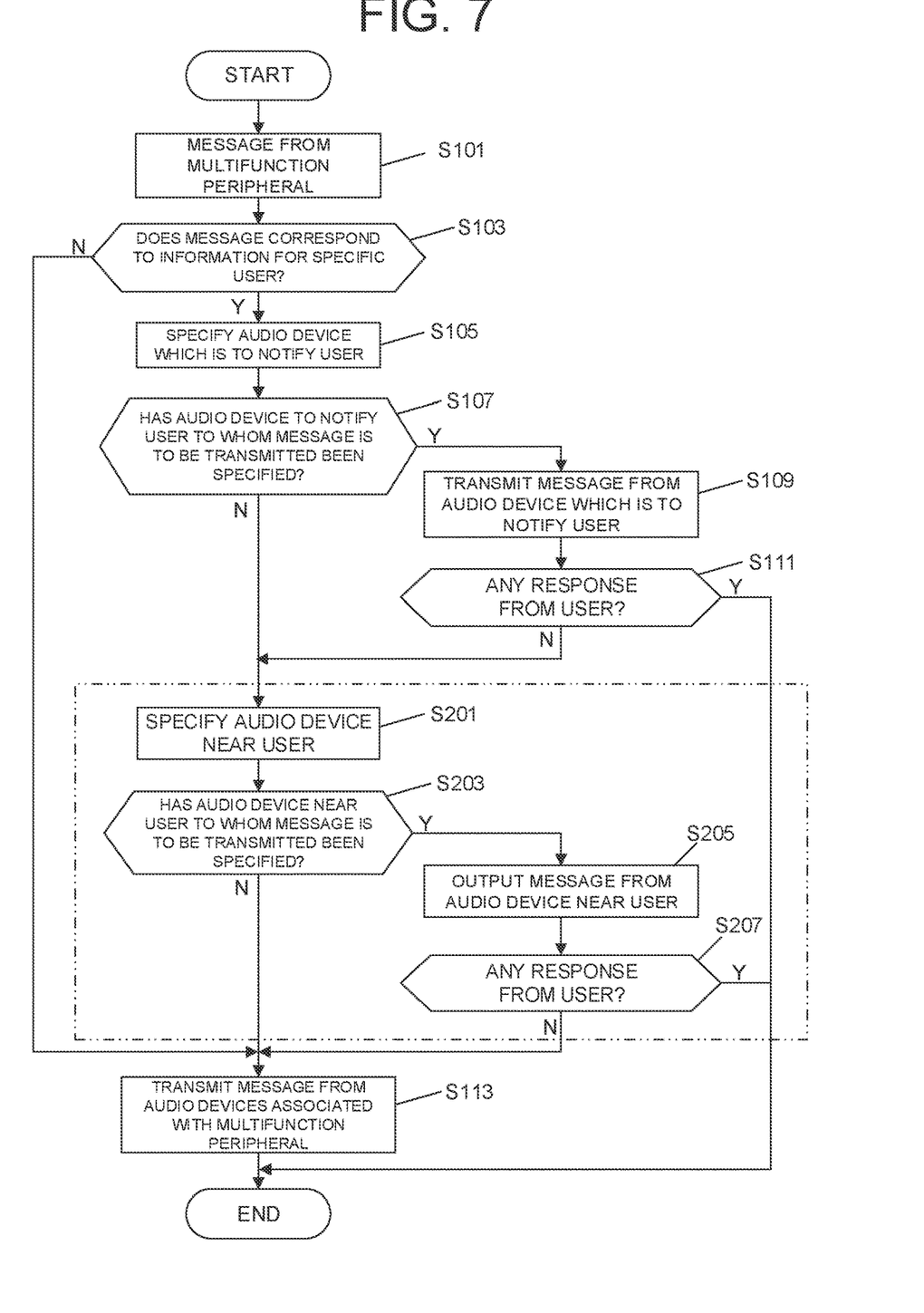
FIG. 7 is a flowchart showing processing steps to be performed in notifying a user of a message from a multifunction peripheral in an information notification system according to a second embodiment.

FIG. 7 is a flowchart showing the processing steps performed in notifying the user of a message from a multifunction peripheral in the information notification system according to the second embodiment.

Note that since the information notification system 1 according to the second embodiment has the same configuration as the configuration of the information notification system 1 of the first embodiment, description of the configuration will be omitted.

Processing Steps for Voice Instruction in Information Notification System

In the information notification system 1 according to the second embodiment, the processing steps performed in notifying the user of a message by voice from a multifunction peripheral 10 will be hereinafter described referring to the accompanying drawing.

Here, processing different in the information notification system 1 according to the second embodiment, more specifically, the parts different as compared to the processing steps for voice instruction in the information notification system 1 according to the first embodiment, will be described.

In the information notification system 1 according to the second embodiment, the processing is carried out, as illustrated in FIG. 7. That is, in the processing steps for voice instruction in the information notification system 1, when it is determined, in step S107, that the audio device, which is located at a place where the user to whom the message is to be notified is present, cannot be specified, and when it is determined, in step S111, that the user has made no response, the processing proceeds to step S201, and the audio device located near the user is specified.

The location of the user is detected by a user position detector 202, on the basis of a result of detection obtained by a human detection device which detects a human by a camera, a human sensor, an entry record, illuminance, a sound, etc., and user information (e.g., information on the room where the user is in by entry through authentication). On the basis of a result of detection by the user position detector 202, an audio device specifying section 203 specifies the audio device located near the user.

Further, it is determined whether the audio device near the user to whom the message is to be notified has been specified (step S203).

In step S203, when it is determined that the audio device near the user to whom the message is to be notified has been specified, the message is notified from the multifunction peripheral 10 to the specified audio device, which is located at a place near the user, and the message is thereby output by voice (step S205).

Then, it is determined whether the user has made a response indicating that the message has been confirmed (step S207). In step S207, when it is determined that the user has made a response indicating that the message has been confirmed, the processing of notification of a message is ended.

Meanwhile, in step S207, when it is determined that the user has made no response indicating that the message has been confirmed, the processing proceeds to step S113. Then, by having the message transmitted from the multifunction peripheral 10 to the associated audio devices without specification of the audio devices, a voice message is output from each of the audio devices associated with the multifunction peripheral 10.

Also, when it is determined, in step S203, that the audio device near the user to whom the message is to be notified is not specified, the processing proceeds to step S113.

In this way, the processing of notification of a message is ended.

By virtue of the above configuration, according to the second embodiment, the information notification system 1 has been structured such that when a specific user is to be notified of a message, the audio device specifying section 203 specifies the audio device which is capable of notifying the message near the user. Accordingly, even if there is no audio device which is capable of directly notifying the specific user of the message, by having the message output near the user, it is possible to make the user recognize that the message has been notified.

Third Embodiment

Next, a third embodiment will be described.

The third embodiment relates to a case where, in notifying a user of a message from a multifunction peripheral 10 in an information notification system 1, it is determined that the message does not correspond to information for a specific user, but corresponds to information concerning all of the users. The third embodiment is characterized in that the audio devices excluding the audio device for which information notification is restricted are specified, among the audio devices associated with the multifunction peripheral 10. Further, the third embodiment is characterized in that when it is determined that the message corresponds to urgent information, all of the audio devices associated with the multifunction peripheral 10 are specified.

Figure 8:
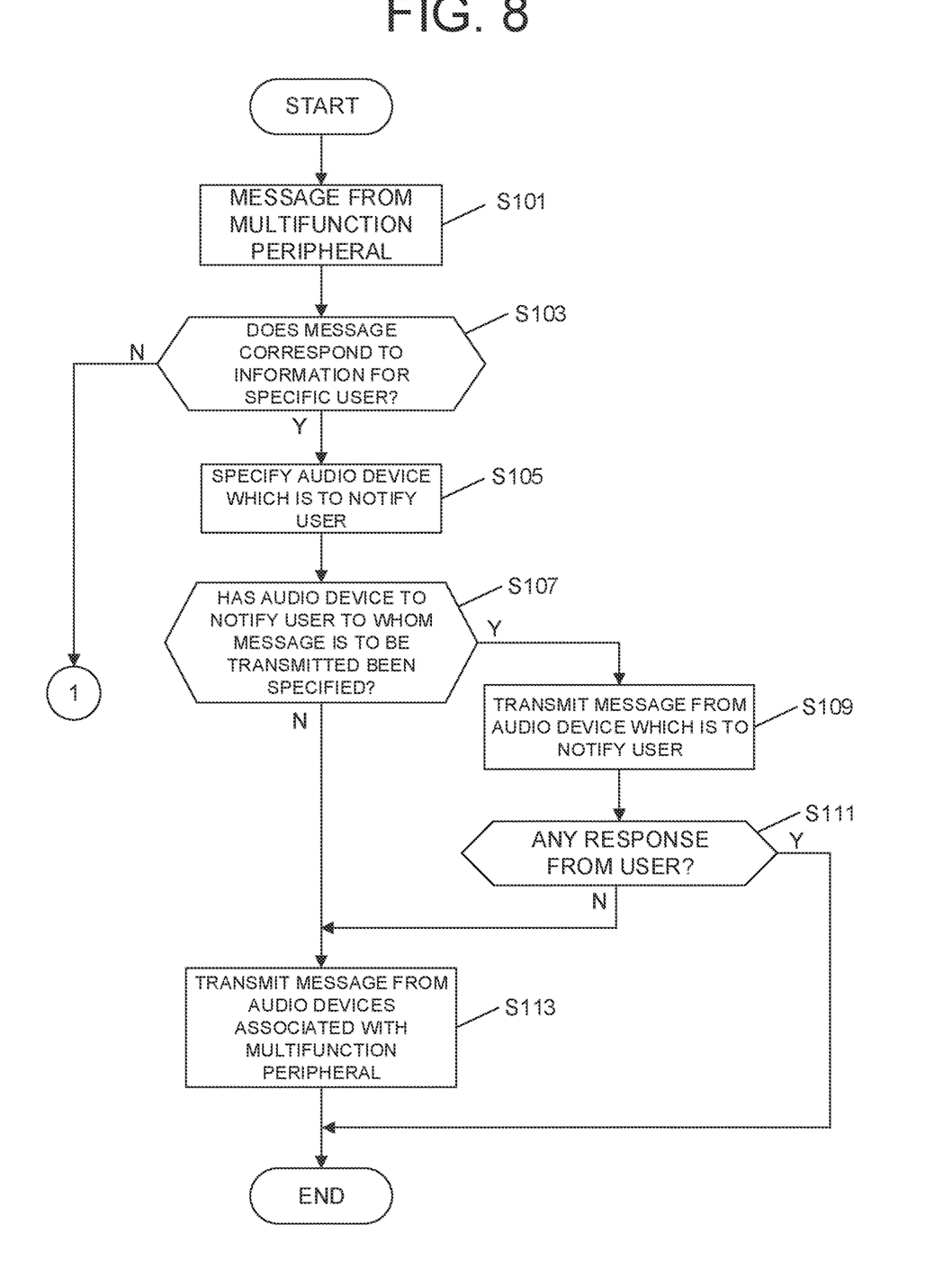
FIG. 8 is a flowchart showing a part of processing steps to be performed in notifying a user of a message from a multifunction peripheral in an information notification system according to a third embodiment.
Figure 9:
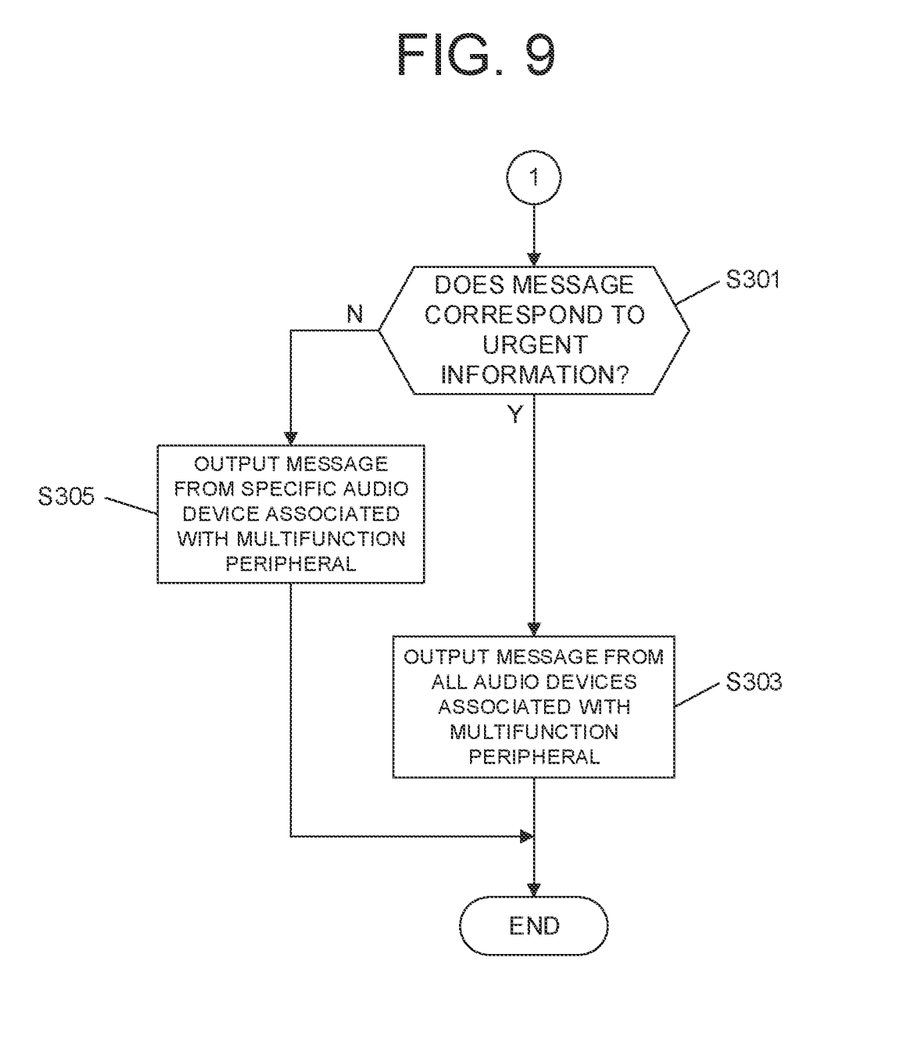
FIG. 9 is a flowchart complementing the processing steps of FIG. 8.

FIG. 8 is a flowchart showing a part of processing steps to be performed in notifying a user of a message from a multifunction peripheral in an information notification system according to the third embodiment, and FIG. 9 is a flowchart complementing the processing steps of FIG. 8.

Note that since the information notification system 1 according to the third embodiment has the same configuration as the configuration of the information notification system 1 of the first embodiment, description of the configuration will be omitted.

In the information notification system 1 according to the third embodiment, the information concerning all of the users includes, for example, information regarding maintenance in general of the multifunction peripheral, such as supply of toner and paper.

Also, the audio device for which information notification is restricted includes, for example, an audio device located in an environment where it is desirable to restrict voice output, such as the audio device located in a conference room where a meeting is taking place, and the audio device at a place where no user is present.

In addition, the information of urgency concerning all of the users includes, for example, information regarding a trouble of the multifunction peripheral itself, and information of social urgency.

Processing Steps for Voice Instruction in Information Notification System

In the information notification system 1 according to the third embodiment, the processing steps performed in notifying the user of a message by voice from a multifunction peripheral 10 will be hereinafter described referring to the accompanying drawing.

Here, processing different in the information notification system 1 according to the third embodiment, more specifically, the parts different as compared to the processing steps for voice instruction in the information notification system 1 according to the first embodiment, will be described.

In the information notification system 1 according to the third embodiment, the processing is carried out, as illustrated in FIGS. 8 and 9. That is, in the processing steps for voice instruction in the information notification system 1, when it is determined, in step S103, that the message does not correspond to information for a specific user, the processing proceeds to step S301, and it is determined whether the message corresponds to urgent information.

In step S301, when it is determined that the message corresponds to urgent information, the processing proceeds to step S303. Then, all of the audio devices that are associated with the multifunction peripheral 10 are specified by an audio device specifying section 203, and the message is notified from the multifunction peripheral 10 to the specified audio devices, so that a voice message is output from all of the audio devices that are associated with the multifunction peripheral 10.

Meanwhile, in step S301, when it is determined that the message does not correspond to urgent information, the processing proceeds to step S305. Then, the message is notified to the audio devices excluding those for which information notification is restricted, which are specified by the audio device specifying section 203, among the audio devices that are associated with the multifunction peripheral 10, and a voice message is thereby output from the audio devices for which information notification is not restricted.

In this way, the processing of notification of a message is ended.

By virtue of the above configuration, according to the third embodiment, the information notification system 1 has been structured such that in a case of notifying the user of a message from the multifunction peripheral 10, when it is determined that the message does not correspond to information for a specific user, but corresponds to information concerning all of the users, specification is made for the audio devices excluding the audio device for which information notification is restricted, among the audio devices associated with the multifunction peripheral 10, to notify the message. Accordingly, it becomes possible to notify of a message regarding the multifunction peripheral 10 to users who will not be bothered by the message notification.

Further, when it is determined that the message corresponds to urgent information, all of the audio devices associated with the multifunction peripheral 10 are specified to notify the message. Consequently, it is possible to notify all of the users of the urgent message.

In view of the foregoing, the present invention is not limited to the examples and embodiments described above, and various modifications can be made within the scope defined by the claims. It is obvious for a person skilled in the art that various changes or modifications are conceivable within the scope of the appended claims. That is, embodiments obtained by combining technical means with changes made as appropriate without departing from the spirit of the present invention also included in the technical scope of the present invention.

DESCRIPTION OF REFERENCE NUMERALS

1 Information notification system
10 Multifunction peripheral (image forming apparatus)
20 Server
31, 32, 33 Audio device (output device)
100, 200, 300 Controller
162, 262 Message information
163, 263 User information
170, 270, 370 Communicator
201 Message determiner (information determiner)
202 User position detector
203 Audio device specifying section (output device specifying section)

What is claimed is:

1. An information processing device comprising:
   one or more processors;
   a first speaker; and
   a communicator that performs communication connections via a network with a second speaker, the second speaker being outside of the information processing device, wherein
   the one or more processors are configured to:
      output information addressed to a specific user from a specific speaker specified from the first speaker and the second speaker based on a location of the specific user; and
      output the information addressed to the specific user from the first speaker and the second speaker if the information output from the specific speaker has not been acknowledged by the specific user.

2. The information processing device according to claim 1, wherein
   the specific speaker is located at the same location where the specific user is present.

3. The information processing device according to claim 1, wherein
   when the one or more processors output information addressed to all of users, the one or more processors output the information addressed to all of the users from the first speaker for which an information notification is not restricted and the second speaker for which the information notification is not restricted.

4. The information processing device according to claim 1, wherein
   when the information comprises urgent information, the one or more processors output the urgent information from the first speaker and the second speaker.

5. The information processing device according to claim 1, wherein
   the one or more processors output the information addressed to the specific user from the first speaker if the one or more processors fail to specify the specific speaker that outputs the information addressed to the specific user to be the first speaker or the second speaker.

6. An information output method for outputting information from a first output device or a second output device,
   wherein the first output device is equipped in an information processing device, and
   the second output device is an external device outside of the information processing device,
   the information output method comprising:
      outputting information addressed to a specific user from a specific output device specified from the first output device and the second output device based on a location of the specific user, and
      outputting the information addressed to the specific user from the first output device and the second output device if the information output from the specific output device has not been acknowledged by the specific user.

7. An information processing device comprising:
   one or more processors;
   a first speaker; and
   a communicator that performs communication connections via a network with a second speaker that is outside the information processing device, wherein
   the one or more processors are configured to:
      output information associated with a specific user from one of the first speaker or the second speaker based on a location of the specific user being near the first speaker or the second speaker,
      output the information associated with the specific user from the first speaker and the second speaker if the information output from either one of the first speaker and the second speaker has not been acknowledged by the specific user,
      output the information associated with the specific user from the first speaker and the second speaker if the one or more processors fail to specify a speaker that outputs the information associated with the specific user.

* * * * *